(12) United States Patent
Nakagiri

(10) Patent No.: US 10,266,094 B2
(45) Date of Patent: Apr. 23, 2019

(54) BICYCLE RETAINER

(71) Applicant: NIPPON SHARYO, LTD., Nagoya-shi, Aichi (JP)

(72) Inventor: Takahisa Nakagiri, Toyokawa (JP)

(73) Assignee: NIPPON SHARYO, LTD., Nagoya-shi (JP)

(*) Notice: Subject to any disclaimer, the term of this patent is extended or adjusted under 35 U.S.C. 154(b) by 83 days.

(21) Appl. No.: 15/542,249

(22) PCT Filed: Nov. 29, 2016

(86) PCT No.: PCT/JP2016/085329
§ 371 (c)(1),
(2) Date: Jul. 7, 2017

(87) PCT Pub. No.: WO2018/100613
PCT Pub. Date: Jun. 7, 2018

(65) Prior Publication Data
US 2018/0264984 A1 Sep. 20, 2018

(51) Int. Cl.
| B60P 3/077 | (2006.01) |
| B60P 7/06 | (2006.01) |
| B60P 3/07 | (2006.01) |
| B61D 33/00 | (2006.01) |
| B61D 37/00 | (2006.01) |
| B61D 45/00 | (2006.01) |
| B62H 3/12 | (2006.01) |
| B62H 3/06 | (2006.01) |

(52) U.S. Cl.
CPC ............... *B60P 3/077* (2013.01); *B60P 3/07* (2013.01); *B60P 7/06* (2013.01); *B61D 33/00* (2013.01); *B61D 37/00* (2013.01); *B61D 45/00* (2013.01); *B62H 3/06* (2013.01); *B62H 3/12* (2013.01)

(58) Field of Classification Search
CPC .... B60P 3/077; B60P 3/07; B60P 7/06; B62H 3/12; B62H 3/00; B61D 45/00; B61D 37/00; B61D 33/00
USPC ............. 296/3, 37.15, 37.16, 69, 64, 65.03; 188/32; 211/18–21; 410/2–3, 9–11, 410/16–19, 30; 224/29.5, 275, 924
See application file for complete search history.

(56) References Cited

U.S. PATENT DOCUMENTS 595,967 A * 12/1897 Parsons
6,247,741 B1 * 6/2001 Seel .................. B60R 5/00
296/37.14

(Continued)

FOREIGN PATENT DOCUMENTS

JP H09-240357 A 9/1997

Primary Examiner — Stephen T Gordon
(74) Attorney, Agent, or Firm — Oliff PLC

(57) ABSTRACT

When a bicycle is removed, a hook is first removed from a hooking ring and a rubber string built from a rim side of a wheel is removed from the wheel. Next, the wheel is removed from the space between a first rack member and a second rack member, thereby the second rack member is automatically and forcibly folded toward a base member and the first rack member through the forcible power of a spring hinge. At that time, although the second rack member collides with the base member or the first rack member, collision shock at the time of collision is relieved by a cushion member. After the bicycle is removed, based on that a seat of a flip-up seat is moved downward, the retaining space for the bicycle can be restored to passenger's seat.

7 Claims, 4 Drawing Sheets

(56) References Cited

U.S. PATENT DOCUMENTS 6,755,599 B1\* 6/2004 Plyler .................... B60P 3/077
   211/21
8,579,350 B2\* 11/2013 Masters .................. A47C 9/06
   296/64

\* cited by examiner (a)        (b)

BICYCLE RETAINER

TECHNICAL FIELD

The present invention relates to a bicycle retainer provided in a passenger room of a railroad carriage, a bus or a ferryboat and retaining a bicycle in such passenger room.

BACKGROUND ART

Conventionally, a bicycle retainer capable of retaining a bicycle in a passenger room of a railroad carriage or a bus is well-known. For such bicycle retainer, an exclusive space to put a bicycle is provided in a passenger room and the bicycle retainer is set and used in the exclusive space However, in a case that an exclusive space for putting a bicycle must be formed, a space for passenger use is reduced corresponding to such exclusive space, therefore it is not preferable. Thus, in a bicycle fixing device disclosed in Patent Literature 1, a retainer for bicycle is provided under a passenger seat on a rear wheel house positioned in the rear of a bus vehicle and the bicycle is retained in a tiered stand seat at the rear position from the rear wheel house. By utilizing such bicycle fixing device, since seats can be normally used when the bicycle is not retained, it will not be spoiled a number of passengers sitting on the seats and a space for passengers.

CITATION LIST

Patent Literature

Patent Literature 1

JP Laid-open Application Publication No. Hei 9-240357

SUMMARY OF INVENTION

Technical Problem

However, in the bicycle fixing device disclosed in Patent Literature 1, in order to retain the bicycle, in addition that it is necessary to store the passenger seat 8 on the rear wheel house 2, it is further necessary to install a wheel bracket 7 on a floor in the bus (see paragraph 0021 of Patent Literature 1), such install operation is very troublesome. Similarly, in order to recover the space once utilized for retaining the bicycle to passenger space, it is demanded very troublesome restoration operation to remove the wheel bracket 7, to store a supporting member 6 for bicycle on the rear wheel house 2 and further to unfold the passenger seat 8. Further, it is necessary to secure the storing space of the wheel bracket 7 which is removed. Furthermore, in the bicycle fixing device disclosed in Patent Literature 1, since the bicycle is retained in a riding state, a storing space for one bicycle becomes large, thus storing efficiency is bad.

The present invention has been made to solve the above problems and has an object to provide a bicycle retainer through which a bicycle can be retained under a state that the bicycle is suspended within a passenger room by simple and easy operation and a space for bicycle can be easily restored to passenger space when the bicycle is removed.

Solution to Problem

In order to accomplish the above object, a bicycle retainer according to the present invention comprising;

a suspension member for suspending one of wheels of a bicycle, the suspension ember being provided at an upper part in a passenger room, a retainer member for retaining another wheel of the bicycle, the retainer member being provided at a lower part in the passenger room, the bicycle retainer retaining the bicycle under a state that the bicycle is suspended in the passenger room, wherein the retainer member includes:

a base member fixed to a back surface of a seat of a flip-up seat;

a first rack member for retaining the wheel while sandwiching, the first rack member being attached to the base member;

a spring hinge provided at a lower part than the first rack member on the base member; and a second rack member for retaining the wheel while sandwiching, the second rack member being connected to the base member through the spring hinge so as to become swingable;

wherein the second rack member is constructed so as to be automatically folded toward the first rack member through the spring hinge under a state that the second rack member does not retain the wheel.

Further, another bicycle retainer according to the present invention comprising: a suspension member for suspending one of wheels of a bicycle, the suspension member being provided at an upper part in a passenger room, a retainer member for retaining another wheel of the bicycle, the retainer member being provided at a lower part in the passenger room, the bicycle retainer retaining the bicycle under a state that the bicycle is suspended in the passenger room, wherein the retainer member includes:

a base member fixed to a lower part of a seat of a flip-up seat;

a first rack member for retaining the wheel while sandwiching, the first rack member being attached to the base member, the first rack member being movable in up and down direction;

a spring hinge provided at a lower end portion of the first rack member; and a second rack member for retaining the wheel while sandwiching, the second rack member being connected to the first rack member through the spring hinge so as to become swingable;

wherein the second rack member is constructed so as to be automatically folded toward the first rack member through the spring hinge under a state that the second rack member does not retain the wheel.

Advantageous Effects of Invention

According to an embodiment of the bicycle retainer, at first, one of wheels of the bicycle is suspended to the suspension member provided at an upper part in a passenger room. The base member of the retainer member is fixed to the back surface of the seat of the flip-up seat, thereby when the second rack member of the retainer member is swung downward around the spring hinge provided at a lower part of the first rack member as a swing axis under a state that the seat of the flip-up seat is tipped up, a space between the first rack member and the second rack member is opened. Further, when another wheel of the bicycle is inserted in the space and retained so as to be sandwiched by the first rack member and the second rack member, another wheel is retained between the first rack member and the second rack member. Therefore, by simple and easy operation, there is an effect that the bicycle can be retained in the passenger room under a state the bicycle is suspended Further, when the bicycle is removed from the bicycle retainer, the second rack member is automatically folded and received toward the first rack member through the spring hinge, therefore the space where the bicycle is retained can be easily restored to the space for passengers. Furthermore, there is an effect that it is possible to prevent an accident that the passengers contact with the second rack member due to the fact that the state in which the second rack member is protruded is continued when the bicycle retainer is not used. Further, since the retainer member is fixed to the back surface of the seat of the flip-up seat, such flip-up seat can be utilized as passenger's seat when the bicycle retainer is not used. That is, in a case that the above bicycle retainer is set, there is an effect that space for passengers is not reduced.

According to another embodiment of the bicycle retainer, at first, one of wheels of the bicycle is suspended to the suspension member provided at an upper part in a passenger room. The base member of the retainer member is fixed to a lower part of the seat of the flip-up seat. When the second rack member of the retainer member is raised upward under a state that the seat of the flip-up seat is tipped up, the second rack member is moved upward with the first rack member on the base member. When the second rack member raised upward is swung downward around the spring hinge provided at the lower end of the first rack member as a swing axis, a space between the first rack member and the second rack member is opened. Further, when another wheel of the bicycle is inserted in the space and retained so as to be sandwiched by the first rack member and the second rack member, another wheel is retained between the first rack member and the second rack member. Therefore, by simple and easy operation, there is an effect that the bicycle can be retained in the passenger room under a state the bicycle is suspended Further, when the bicycle is removed from the bicycle retainer, the second rack member is automatically folded toward the first rack member through the spring hinge and is moved downward with the first rack member on the base member and received. Therefore, the space where the bicycle is retained can be easily restored to the space for passengers. Furthermore, there is an effect that it is possible to prevent an accident that the passengers contact with the second rack, member due to the fact that the state in which the second rack member is protruded is continued when the bicycle retainer is not used. Further, since the retainer member is fixed to the lower part of the seat of the flip-up seat, such flip-up seat can be utilized as passenger's seat when the bicycle retainer is not used. That is, in a case that the above bicycle retainer is set, there is an effect that space for passengers is not reduced.

According to embodiments of the bicycle retainer, the base member further comprises a stopper member to prevent the first rack member and the second rack member from being dropped downward by contacting with the second rack member when the first rack member and the second rack member retain the wheel under a state that both the first rack member and the second rack member are raised up. Therefore, there is an effect that the bicycle can be retained by maintaining sandwich of the wheel through the first rack member and the second rack member.

According to embodiments of the bicycle retainer, the bicycle retainer further comprises a cushion member to relieve shock occurring when the second rack member is folded based on that the second rack member is automatically folded toward the first rack member through the spring hinge. Therefore, in a case that the bicycle is removed from the retainer member, there is an effect that collision sound occurring due to collision with other members when the second rack member is automatically folded can be relieved (lowered).

According to embodiments of the bicycle retainer, the following effect can be obtained. Under a state that the wheel is sandwiched and retained by the first rack member and the second rack member of the retainer member, a string member attached to the base member is inserted in the wheel from a rim side and a hook member attached to the string member is hooked with a hooked member. Thereby, the wheel can be further retained by the string member from the other side of the first rack member and the second rack member. Besides, since the string member has elasticity, there is an effect that the above retaining can be strongly conducted.

DESCRIPTION OF EMBODIMENTS

Figure 1:
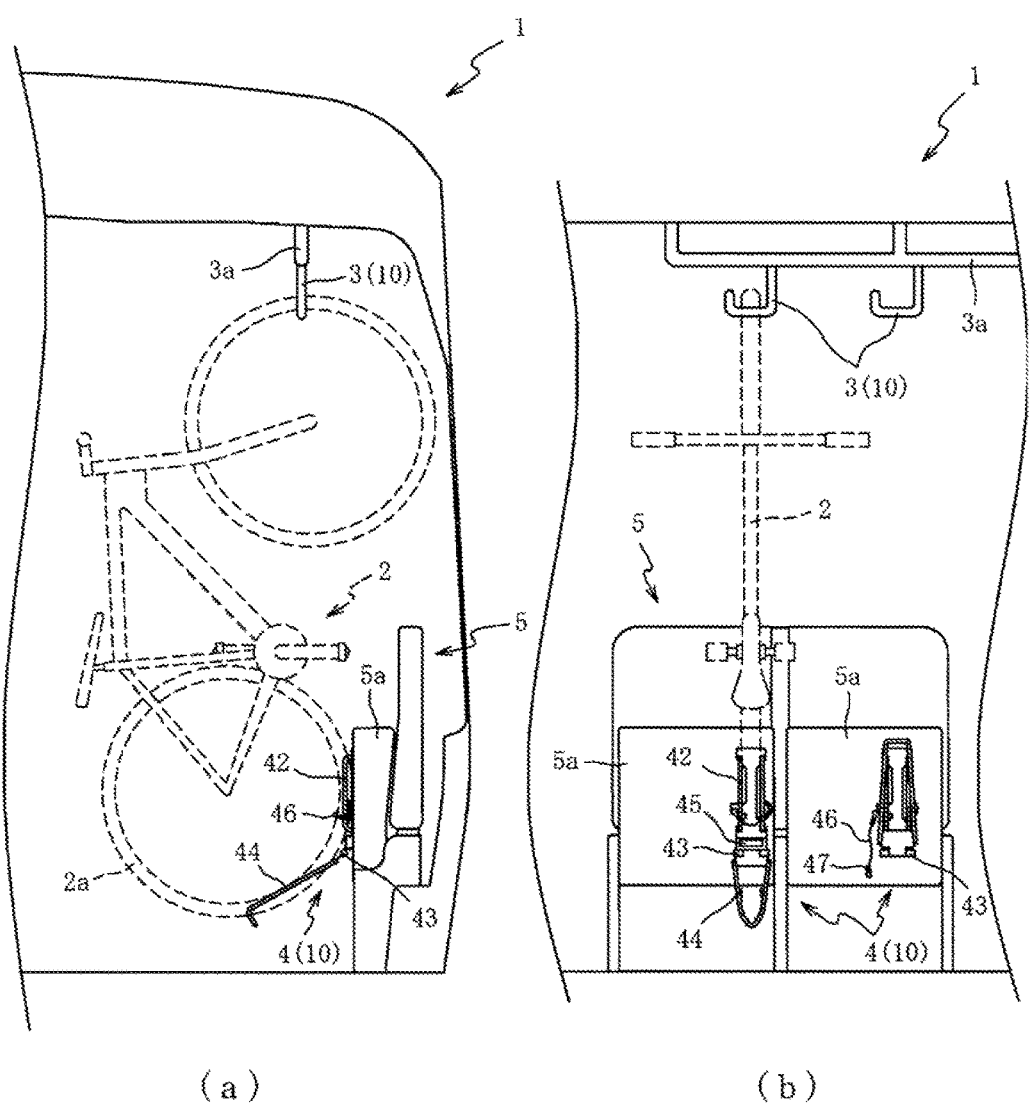
FIG. 1 is a figure showing a use state of a bicycle retainer in the first embodiment of the present invention, (a) is a sectional view of a railroad carriage when viewed along a track and (b) is a sectional view of the railroad carriage when viewed along a railroad tie.

Hereinafter, the preferred embodiment of the present invention will be described with reference to the attached drawings. A bicycle retainer 10 of the present embodiment is utilized for retaining a bicycle 2 under a state that the bicycle 2 is suspended in a passenger room of a railroad carriage 1. First, referring to FIGS. 1 and 2, the bicycle retainer 10 of the first embodiment will be described. FIG. 1 is a figure showing a use state of the bicycle retainer 10 in the first embodiment. FIG. 1(a) is a partial sectional view of the railroad carriage 1 when viewed along the track and FIG. 1 (b) is a partial sectional view of the railroad carriage 1 when viewed along the railroad tie. Here, the bicycle 2 is shown by a broken line.

The bicycle retainer 10 of the first embodiment is utilized for a case that a flip-up seat 5 is, for example, a long seat arranged toward the railroad tie direction. The bicycle retainer 10 is constructed from an upper hook 3 and a lower retainer member 4. The upper hook 3 is formed as an L-shaped hook member hung down from an iron bar 3a fixed to a ceiling surface in the passenger room of the railroad carriage 1. As shown in FIG. 1(a) and FIG. 1 (b), the bicycle 2 is suspended by inserting one (front wheel in FIG. 1) of wheels in the bicycle 2 to the upper hook 3.

Figure 2:
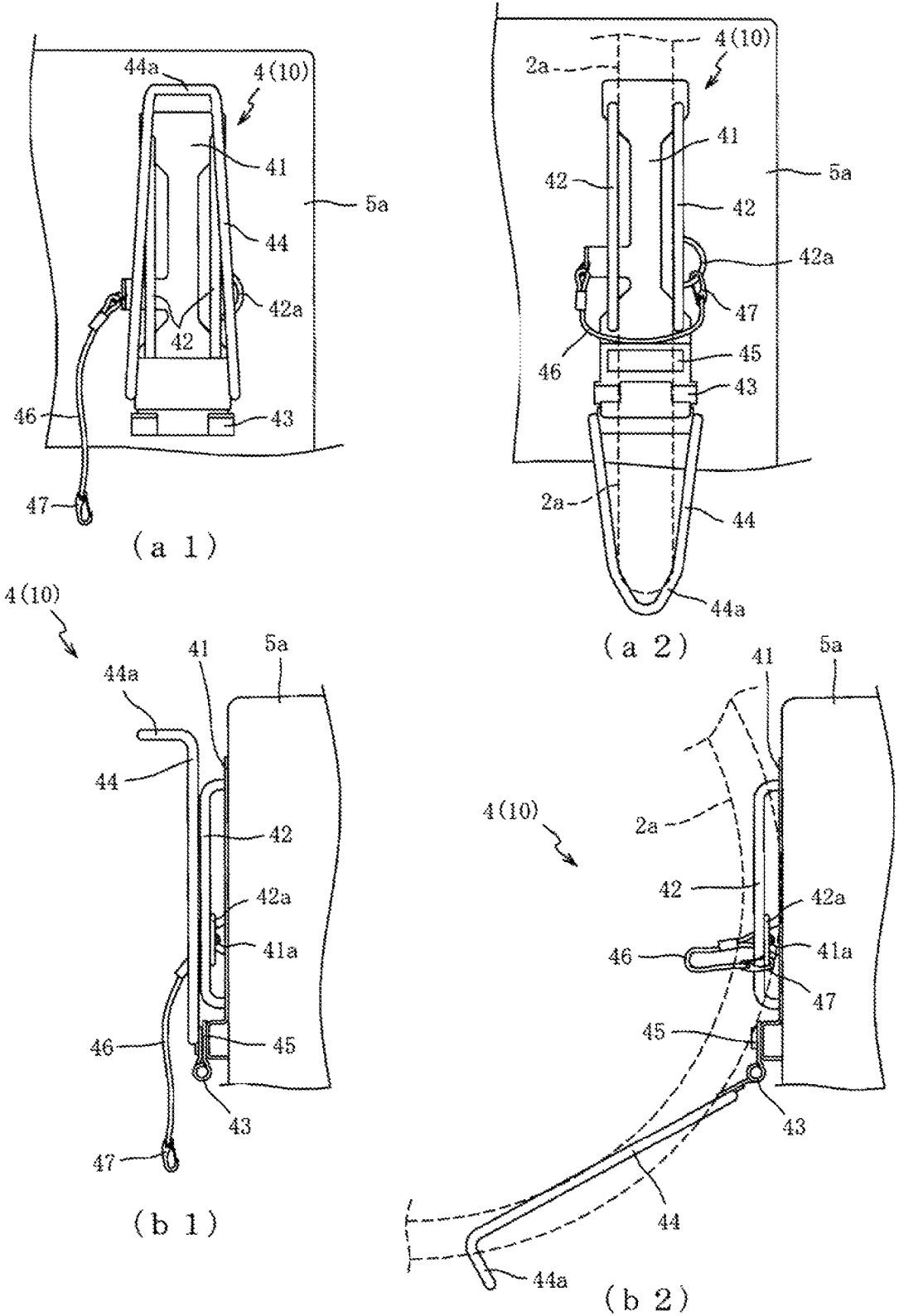
FIG. 2 is an enlarged figure of a lower retainer member, (a1) is a front view of the lower retainer member under a state that the wheel is not retained, (b1) is a side view thereof, and (a2) is a front view of the lower retainer member under a state that the wheel is retained, (b2) is a side view thereof.

A lower retainer member 4 retains another wheel 2a (rear wheel in FIG. 1) of the bicycle 2 that one of wheels is suspended and is fixed to a back surface of a seat 5a of a flip-up seat 5. FIG. 2 is an enlarged figure of the lower retainer member 4. Further, FIG. 2 (a1) is a front view of the lower retainer member 4 in a state that the wheel 2a is not retained and FIG. 2 (b1) is a side view thereof. Further, FIG. 2 (a2) is a front view of the lower retainer member 4 in a state that the wheel 2a is retained and FIG. 2 (b2) is a side view thereof. Here, the wheel 2a of the bicycle 2 is shown by broken line.

As shown in FIG. 2 (a1) and FIG. 2 (b1), a base member 41 of the lower retainer member 4 is fixed on the back surface of the seat 5a of the flip-up seat 5 by screws and the like. The base member 41 is formed into a plate like member which is extended in the up and down direction on the back surface of the seat 5a tipped up. At both sides of the base member 41, a first rack member 42 is arranged as a pair of rod-like members. As shown in FIG. 2 (a2), the wheel 2a of the bicycle 2 is sandwiched between the pair of rod-like members in the first rack member 42 and retained therebetween.

At a lower end of the base member 41 under the first rack member 42, a spring hinge 43 is arranged. To the spring hinge 43, a second rack member 44 is arranged. Therefore, the second rack member 44 is made swingable in an open direction and a close direction against the base member 41 and the first rack member 42 around the spring hinge 43 as a swing axis.

As shown in FIG. 2 (a1), the second rack member 44 is constructed so as to have a space with a trapezoid form a top of which is tapered off when viewed from a front side. The wheel 2a of the bicycle 2 is sandwiched and retained within the above trapezoid space. As shown in FIG. 2 (b1), a top portion 44a of the second rack member 44 is formed in an L-shape when viewed from a side surface. The top portion 44a formed in the L-shape is formed in a triangle shape tapered off (substantially V shape). By grasping the top portion 44a of the second rack member 44 and swinging the second rack member 44 toward the other side of the first rack member 42, a space between the first rack member 42 and the second rack member 44 is opened as shown in FIG. 2 (b2). Further, by inserting the wheel 2a of the bicycle 2 in the space between the first rack member 42 and the second rack member 44, the wheel 2a of the bicycle 2 is retained to the lower retainer member 4.

On a contact surface of the spring hinge 43 contacting with the second rack member 44 on the base member 41, a cushion member 45 made of sponge, resin or rubber with a rectangular plate shape is adhered. The cushion member 45 relieves (lowers) collision shock (collision sound) occurring due to collision of the second rack member 44 and the base member 41 or the first rack member 42 when the second rack member 44 is forcibly folded toward the first rack member 42 through forcible power of the spring hinge 43, in a case that the wheel 2a of the bicycle 2 is removed from the space between the first rack member 42 and the second rack member 44.

At one side of the base member 41 (left side in FIG. 2 (a1)), a circular hole portion 41a is formed, and to the circular hole portion 41a, a rubber string 46 with elasticity is attached. To a top portion of the rubber string 46, a hook 47 is attached. This hook 47 is capable of hooking in a semi-circle hooking ring 42a arranged in the first rack member 42 at the other side of the circular hole portion 41a.

Next, a usage of the bicycle retainer 10 will be described. As shown in FIG. 1, in a case that the bicycle 2 is retained to the bicycle retainer 10, one wheel 2a of the bicycle 2 (front wheel in FIG. 1) is first suspended to the upper hook 3 under a state that the seat 5a of the flip-up seat 5 is tipped up. Under a state that the bicycle 2 is suspended to the upper hook 3, the second rack member 44 of the lower retainer member 4 is opened downward around the spring hinge 43 as the swing axis and the wheel 2a of the bicycle 2 is inserted in the space between the first rack member 42 and the second rack member 44 which are opened each other. Then, the wheel 2a is sandwiched and retained between the pair of rod members of the first rack member 42 and simultaneously sandwiched and retained in the trapezoid space of the second rack member 44. Under this state, the rubber string 46 is passed from one side of the wheel 2a to the other side thereof through rims of the wheel 2a and the hook 47 provided on the top portion of the rubber string 46 is hooked with the hooking ring 42a of the first rack member 42.

Since the second rack member 44 is forced toward the first rack member 42 side through the spring hinge 43, the lower wheel 2a of the bicycle 2 can be surely retained between the first rack member 42 and the second rack member 44. Furthermore, since the second rack member 44 is formed in the trapezoid shape tapered off when viewed from the front side, the wheel 2a can be stably retained in the trapezoid space regardless of the tire width of the wheel 2a. In addition, since the top portion 44a of the second rack member 44 is formed in the triangle shape (substantially V-shape) tapered off, the wheel 2a can be stably retained at two points of the tire regardless of the tire width of the wheel 2a. Here, when the top portion is formed in the U-shape, there will be a case that the tire is retained at one point of the bottom portion in the U-shape. In this case, it is lacking in stability to retain the wheel 2a at the time of picking up speed and slowing down of the railroad carriage 1.

Furthermore, based on the present bicycle retainer 10, since the wheel 2a is retained under a state that the wheel 2a is fastened toward first rack member 42 through the rubber string 46 passed through the rim side, the wheel 2a can be more strongly retained. Therefore, even if big vibration occurs due to picking up speed and slowing down of the railroad carriage 1, it is possible to prevent the wheel 2a from coming off from the first rack member 42 and the second rack member 44, thereby the wheel 2a can be surely retained to the lower retainer member 4. In addition, although the bicycle 2 of the present embodiment is suspended so that the wheel 2a is arranged along the direction of the railroad tie, the wheel 2a can be surely retained through the rubber string 46 against shake in the direction of the railroad tie. That is to say, it can prevent the wheel 2a from being got away in the opposite direction side to the passing direction through the lower retainer member 4, due to shake in the direction of the railroad tie, as a result, the wheel 2a can be surely retained to the lower retainer member 4. As mentioned in the above, the bicycle 2 can be retained under a state that the bicycle 2 is suspended in the passenger room of the railroad carriage 1 by the bicycle retainer 10.

When the bicycle 2 retained to the bicycle retainer 10 is removed, the hook 47 is first removed from the hooking ring 42a and the rubber string 46 built from the rim side of the wheel 2a is removed from the wheel 2a. Next, the wheel 2a is removed from the space between the first rack member 42 and the second rack member 44, thereby the second rack member 44 is automatically and forcibly folded toward the base member 41 and the first rack member 42 through the forcible power of the spring hinge 43. At that time, although the second rack member 44 collides with the base member 41 or the first rack member 42, collision shock (collision sound) at the time of collision is relieved (lowered) by the cushion member 45. After the bicycle 2 is removed, based on that the seat 5a of the flip-up seat 5 is moved downward, the retaining space for the bicycle 2 can be restored to passenger's seat.

As described above, according to the bicycle retainer 10 of the present embodiment, since the bicycle 2 is retained under a state that the bicycle 2 is suspended, many bicycles 2 can be retained within a small space, in comparison with a case that the bicycle 2 is retained in a riding state. Furthermore, since the bicycle 2 is suspended so that the wheel 2a of the bicycle 2 is lined up along the direction of the railroad tie, each bicycle 2 can be individually retained or taken out one by one from the passage in the passenger room. Further, in a case that the bicycle 2 is not retained, based on that the seat 5a of the flip-up seat 5 is returned, such space can be utilized as the passenger's seat. Therefore, even if the bicycle retainer 10 is installed in the passenger room, the space for passengers is not reduced. In addition, when the bicycle 2 is removed from the bicycle retainer 10 (lower retainer member 4), the second rack member 44 is automatically folded toward the first rack member 42 and received through the spring hinge 43, therefore the lower retainer member 4 can be easily received and it is possible to prevent an accident that the passengers contact with the second rack member 44 due to the fact that the state in which the second rack member 44 is protruded is continued when the bicycle retainer 10 is not used.

Since the hook 47 attached to the top portion of the rubber string 46 is hooked in the hooking ring 42a formed in the first rack member 42, disassembly thereof can be easily done. For example, when the hook 47 is hooked with the rod member of the first rack member 42, since the hook 47 is moved to the up and down direction along the rod member at the time of disassembly, such disassembly becomes difficult.

Next, referring to FIGS. 3 and 4, a bicycle retainer 11 of the second embodiment will be described. The mentioned bicycle retainer 10 of the first embodiment is utilized in a case that the flip-up seat 5 is, for example, a long seat which is arranged in the direction of the railroad tie, and the lower retainer member 4 is fixed to the back surface of the seat 5a of the flip-up seat 5. On the contrary, the bicycle retainer 11 of the second embodiment is utilized in a case that the flip-up seat 5 is, for example, a cross seat which is arranged in the direction of the railroad track. Therefore, a lower retainer member 7 is fixed to a side wall of the passenger room in the railroad carriage 1 under the seat 5a of the flip-up seat 5. That is, in the bicycle retainer 11 of the second embodiment, the arrangement position of the lower retainer member 7 is lower than that of the lower retainer member 4 in the first embodiment. Therefore, when the bicycle retainer 11 of the second embodiment is used, it is constructed so that the wheel 2a of the bicycle is retained after a first rack member 72 and a second rack member 74 of the lower retainer member 7 are once raised upward. Here, in description of the second embodiment described hereinafter, the same references used for the same elements and the like as those in the first embodiment will be attached and explanation thereof will be omitted.

Figure 3:
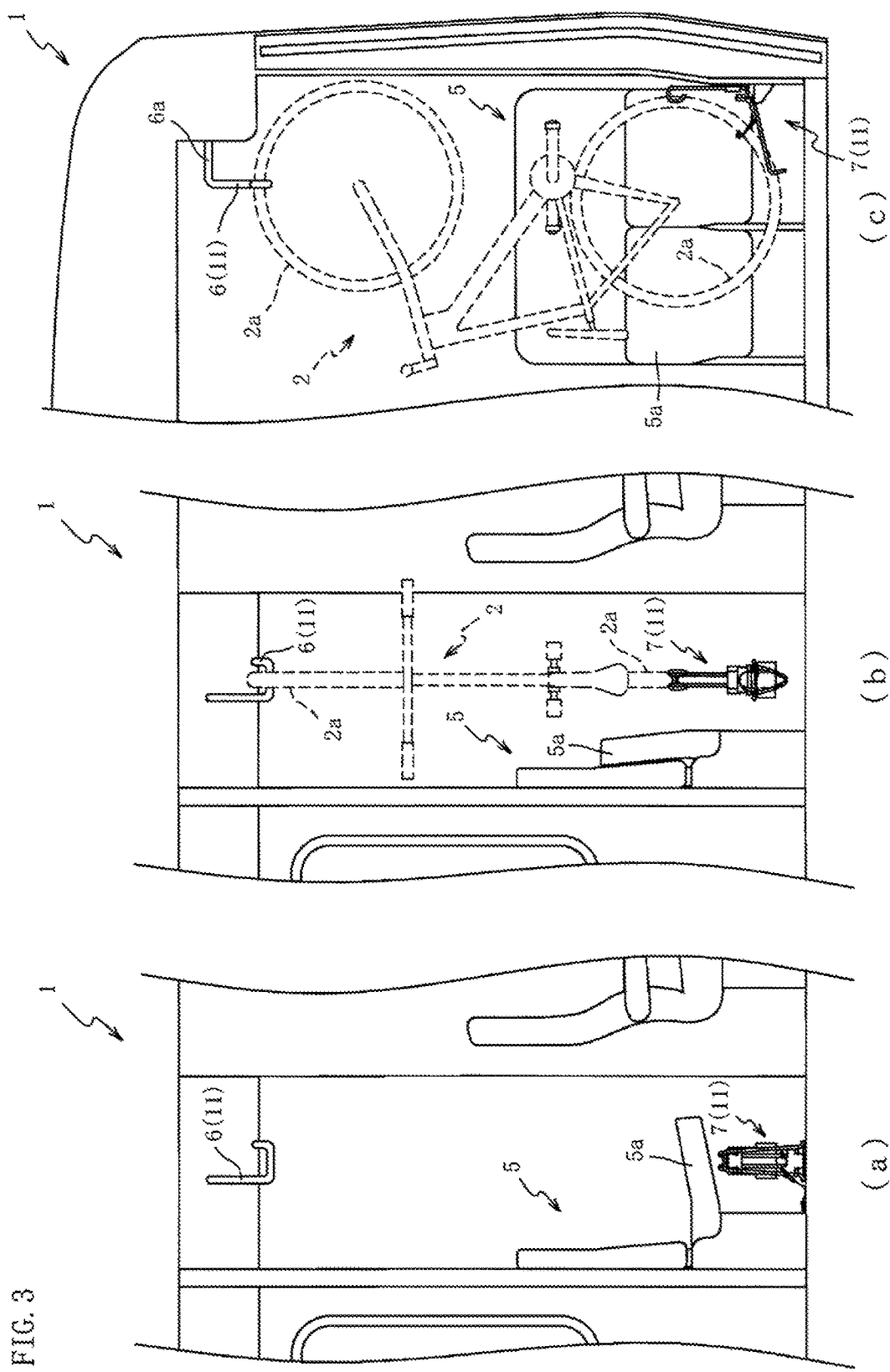
FIG. 3 is a figure showing the bicycle retainer in the second embodiment of the present invention, (a) is a partial sectional view of the railroad carriage when viewed along the railroad tie, (b) is a view showing a use state of the bicycle retainer when viewed along the railroad tie, and (c) is a view showing a use state of the bicycle retainer when viewed along the track.

FIG. 3 is a figure showing the bicycle retainer 11 in the second embodiment. FIG. 3 (a) is a partial sectional view (view of appearance) of the railroad carriage 1 when viewed along the railroad tie, FIG. 3 (b) is a view showing a use state of the bicycle retainer 11 when viewed along the railroad tie, and FIG. 3 (c) is a view showing a use state of the bicycle retainer 11 when viewed along the track.

The bicycle retainer 11 is constructed from an upper hook 6 and the lower retainer member 7. The upper hook 6 is formed as an L-shaped hook member and hung down from an iron bar 6a fixed to a side wall upper than a shutter box in the railroad carriage 1. As shown in FIGS. 3 (b) and 3 (c), one of the wheels (front wheel in FIG. 3) of the bicycle 2 is passed through the upper hook 6, thereby the bicycle 2 is suspended. Generally, the shutter box does not have windows. Therefore, based on that the upper hook 6 is arranged at an upper portion of the shutter box in the railroad carriage 1, even if the bicycle 2 retained to the bicycle retainer 11 is greatly shaken according to vibration f the railroad carriage 1, it does not occur that windows are broken.

The lower retainer member 7 retains another wheel 2a (rear wheel in FIG. 3) of the bicycle 2 one wheel of which is suspended and is fixed to the side wall of the passenger room at the lower position of the seat 5a of the flip-up seat 5. FIG. 4 is an enlarged figure of the lower retainer member 7. Further, FIG. 4 (a1) is a front view of the lower retainer member 7 in a state that the wheel 2a is not retained, and FIG. 4 (b1) is a side view thereof. FIG. 4 (a2) is a front view under a state that the first rack member 72 and the second rack member 74 of the lower retainer member 7 are raised upward to retain the wheel 2a, and FIG. 4 (b2) is a side view thereof. FIG. 4 (a3) is a front view of the lower retainer member 7 under a state that the wheel 2a is retained and FIG. 4 (b3) is a side view thereof.

Figure 4:
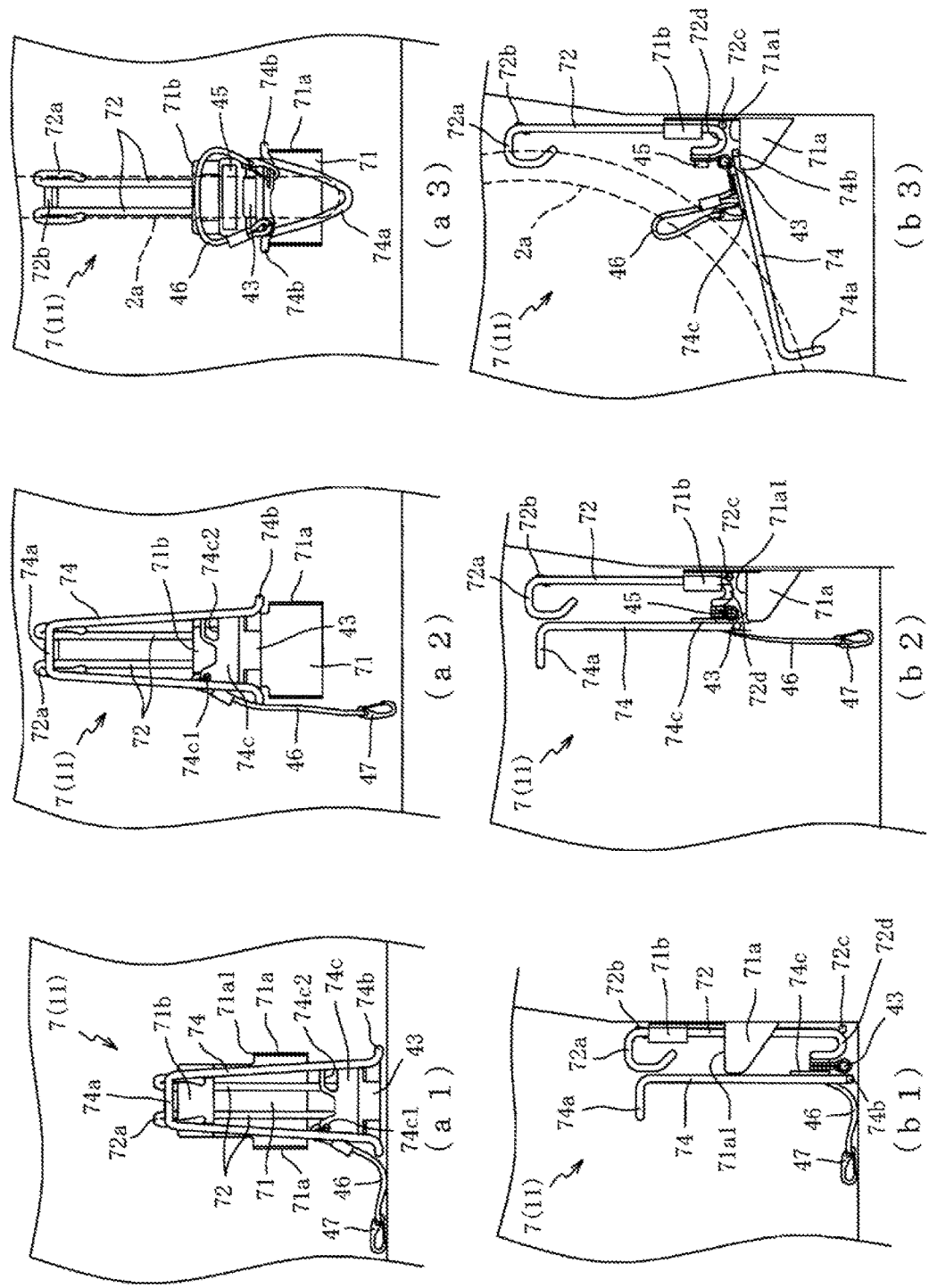
FIG. 4 is an enlarged figure of the lower retainer member, (a1) is a front view of the lower retainer member when the wheel is not retained, (b1) is a side view thereof, and (a2) is a front view under a state that the first rack member and the second rack member of the lower retainer member are raised upward to retain the wheel, (b2) is a side view thereof, and (a3) is a front view of the lower retainer member under a state that the wheel is retained, (b3) is a side view thereof.

As shown in FIGS. 4 (a1) and (b1), the base member 71 of the lower retainer member 7 is fixed to the side wall of the passenger room at the lower position of the seat 5a of the flip-up seat 5 by screws. At lower both sides of the base member 71, a pair of brackets 71a is formed and at the upper position of the base member 71, a guide 71b to guide up and down motion of the first rack member 72 is formed.

The pair of brackets 71a is formed as plate like members each of which has substantially a triangle shape protruded forward from the side wall of the passenger room in the railroad carriage 1. The upper side portion 71a1 of the brackets 71a with substantial triangle shape is almost horizontally formed (substantially vertical to side wall of passenger room) and the second rack member 74 described later is supported by the upper side portion 71a1 (see FIGS. 4 (a3) and (b3)). The guide 71b is formed so as to have a pair of passages extending in the up and down direction and the passages guide up and down motion of the first rack member 72 as a pair of rod members inserted in the passages.

In the guide member 71b of the base member 71, the first rack member 72 is passed therethrough. The first rack member 72 is formed as a pair of rod members and, as shown in FIG. 4 (b1), the upper top portion 72a of each rod member is formed into a rectangular shape protruded forward when viewed from the side. As shown in FIGS. 4 (a3) and (b3), the wheel 2a of the bicycle 2 is inserted between the top portions 72a and sandwiched and retained through the pair of top portions 72a. Here, in the pair of rod members of the first rack member 72, the upper end portion and the lower end portion are respectively connected by joining members 72b and 72c. Therefore, the rod members of the first rack member 72 are integrally moved in the up and down direction along the guide 71b of the base member 71. Further, the joining members 72b and 72c function as a stopper member which prevents the first rack member 72 from coming off from the guide 71b of the base member 71 when the first rack member 72 vertically moves in the up and down direction.

A lower end portion 72d of the first rack member 72 is bent and formed into a U-shape, and the spring hinge 43 is attached to the top portion thereof. To the other end portion of the spring hinge 43, the second a k member 74 is arranged and the second rack member 74 is made swingable around the spring hinge 43 as the swing axis in the open direction or the close direction against the base member 71 and the first rack member 72. Here, on a contact surface of the spring hinge 43 contacting with the second rack member 74, the cushion member 45 is adhered to relieve (lower) collision shock (collision sound) when the second rack 74 is folded.

As shown in FIG. 4 (a1), the second rack member 74 is formed so as to have a trapezoid space which is tapered off when viewed from the front. In the trapezoid space, the wheel 2a of the bicycle 2 is sandwiched and retained. As sown in FIGS. 4 (b1) a top portion 74a of the second rack member 74 is formed into an L-shape when viewed from the side. The top portion 74a formed into the L-shape formed into a t angle shape (substantially V-shape) which is tapered off. Further, a lower end portion 74b of the second rack member 74 is formed so as to protrude outward. As shown in FIGS. 4 (a3) and (b3), when the second rack member 74 is opened against the first rack member 72, the lower end portion 74b of the second rack member 74 contacts with the upper side portion 71a1 of the brackets 71a in the base member 71. Therefore, the second rack member 74 is supported by the brackets 71a of the base member 71 under a state that the wheel 2a of the bicycle 2 is retained and the position of the second rack member 74 in the up and down direction is retained.

Further, on the contact surface of a lower portion of the second rack member 74 contacting with the spring hinge 43, a joining plate 74e is attached. At one side of the joining plate 74c, a circular hole portion 74c1 is formed and, at the other side of the joining plate 74c, a trapezoid opening portion 74c2 is formed. To the circular hole portion 74c1, the rubber string 46 with elasticity is attached and the hook 47 attached to the top portion of the rubber string 46 is made capable of hooking with the trapezoid opening portion 74c2 of the joining plate 74c.

Next, a usage of the bicycle retainer 11 according to the second embodiment will be described. As shown in FIGS. 3 (b) and (c), when the bicycle 2 is retained to the bicycle retainer 11, one of wheels of the bicycle 2 (front wheel in FIG. 3) is first suspended to the upper hook 6 under a state that the seat 5a of the flip-up seat 5 is tipped up.

Under a state that the bicycle 2 is suspended to the upper hook 6, as shown in FIGS. 4 (a2) and (b2), the first rack member 72 and the second rack member 74 of the lower retainer member 7 are raised upward (slid upward). Here, since the first rack member 72 and the second rack member 74 are connected through the spring hinge 43, both the first rack member 72 and the second rack member 74 can be easily raised upward by grasping the top portion 74a of the second rack member 74 and raising upward.

Under a state that both the first rack member 72 and the second rack member 74 are raised upward, as shown in FIGS. 4 (a3) and (b3), the second rack member 74 is opened downward around the spring hinge 43 as the swing axis. This opening can be also easily done by grasping the top portion 74a of the second rack member 74. That is, by grasping the top portion 74a of the second rack member 74, both raising of the first rack member 72 and the second rack member 74 and opening of the second rack member 74 can be easily conducted.

The wheel 2a of the bicycle 2 is inserted between the first rack member 72 and the second rack member 74 which are opened each other. Thereby, the wheel 2a is sandwiched and retained by a pair of top portions 72a of the first rack member 72 and further sandwiched and retained in the trapezoid space of the second rack member 74. Under this state, the rubber string 46 is passed from one side of the wheel 2a to the other side of the wheel 2a through the rim of the wheel 2a. Further, the hook 47 attached to the top end of the rubber string 46 is hooked with the trapezoid opening portion 74c2 formed in the joining plate 74c in the second rack member 74.

Since the second rack member 74 is forced toward the first rack member 72 side through the spring hinge 43, the lower wheel 2a of the bicycle 2 can be surely retained between the first rack member 72 and the second rack member 74. Furthermore, since the wheel 2a is retained under a state that the wheel 2a is fastened toward the second rack member 74 through the rubber string 46 passed through the rim side, the wheel 2a can be more strongly retained. Therefore, even if big vibration occurs due to picking up speed and slowing down of the railroad carriage 1, it is possible to prevent the wheel 2a from coming off from the first rack member 72 and the second rack member 74, thereby the wheel 2a can be surely retained to the lower retainer member 7. In addition, although the bicycle 2 of the present embodiment is suspended so that the wheel 2a is arranged along the direction of the railroad tie, the wheel 2a can be surely retained through the rubber string 46 against shake in the direction of the railroad tie. That is to say, it can prevent the wheel 2a from being got away in the opposite direction side to the passing direction through the lower retainer member 7 due to shake in the direction of the railroad tie, as a result, the wheel 2a can be surely retained to the lower retainer member 7. As mentioned in the above, the bicycle 2 can be retained under a state that the bicycle 2 is suspended in the passenger room.

In a case that the bicycle 2 retained to the bicycle retainer 11 is removed, the hook 47 is first removed from the trapezoid opening portion 74c2 of the joining plate 74c. At that time, since the hook 47 is hooked with the trapezoid opening portion 74c2, removal thereof can be easily done. For example, in a case that the hook 47 is hooked with the rod member, the hook 47 moves in the up and down direction along the rod member, as a result, such removal becomes difficult.

After the hook 47 is removed, the rubber string 46 put over from the rim side of the wheel 2a is removed from the wheel 2a. Next, the wheel 2a is removed from the space between the first rack member 72 and the second rack member 74, thereby the second rack member 74 is automatically and forcibly folded toward the first rack member 72 by forcible power of the spring hinge 43. At that time, although the second rack member 74 collides with the first rack member 72, such shock (collision und) at the time of collision relieved (lowered) by the cushion member 45.

As shown in FIGS. 4 (a2) and (b2), when the second rack member 74 is folded, the lower end portion 74b of the second rack member 74 does not contact with the upper side portion 71a1 of the brackets 71a, thereby support of the second rack member 74 by the brackets 71a is canceled. Therefore, the second rack member 74 moves downward with the first rack member 72 by deadweight thereof while being guided through the guide 71b of the base member 71.

That is, when the wheel 2a is removed from the space between the first rack member 72 and the second rack member 74, the second rack member 74 is automatically folded, thereafter the second rack member 74 is moved downward with the first rack member 72 by deadweight, and as shown in FIGS. 4 (a1) and (b1), the second rack member 74 is automatically received. Thereafter, the bicycle 2 is removed from the upper hook 6, and as shown in FIG. 3 (a), the seat 5a of the flip-up seat 5 is moved downward. Thereby, retaining space for the bicycle 2 can be restored to passenger's seat.

As described above, according to the bicycle retainer 11 of the second embodiment, since the bicycle 2 is retained under a state that the bicycle 2 is suspended, many bicycles 2 can be retained within a small space, in comparison with a case that the bicycle 2 is retained in a riding state. Furthermore, since the bicycle 2 is suspended so that the wheel 2a of the bicycle 2 is lined up along the direction of the railroad tie, each bicycle 2 can be individually retained or taken out one by one from the passage in the passenger room. Further, in a case that the bicycle 2 is no, retained, based on that the seat 5a of the flip-up seat 5 is returned, such space can be utilized as the passenger's seat. Therefore, even if the bicycle retainer 11 is installed in the passenger room, the space for passengers is not reduced. In addition, when the bicycle 2 is removed from the bicycle retainer 11 (lower retainer member 7), the second rack member 74 is automatically folded toward the first rack member 72 through spring hinge 43 and moves downward with the first rack member 72 by deadweight thereof and automatically received. Therefore, the lower retainer member 7 can be easily received and it is possible to prevent an accident that the passengers contact with the second rack member 74 due to the fact that the state in which the second rack member 74 is protruded is continued when the bicycle retainer 11 is not used.

As mentioned in the above, although the present invention is described based on each embodiment, the present invention is not limited to the embodiments mentioned above, therefore it will be easily guessed that various modifications and changes can be done within the scope not deviating concept of the present invention.

For example, in each of the embodiments, it is described a case that the bicycle retainers 10 and 11 are installed in the passenger room in the railroad carriage 1. However, it is not necessary limited to the railroad carriage 1, the bicycle retainers 10 and 11 may be installed in the car other than the railroad carriage 1, for example, they may be adapted in the passenger room of a bus vehicle or a ferryboat.

The invention claimed is:

1. A bicycle retainer comprising a suspension member for suspending one of wheels of a bicycle, the suspension member being provided at an upper part in a passenger room, a retainer member for retaining another wheel of the bicycle, the retainer member being provided at a lower part in the passenger room, the bicycle retainer retaining the bicycle under a state that the bicycle is suspended in the passenger room, wherein the retainer member includes:
a base member fixed to a back surface of a seat of a flip-up seat;
a first rack member for retaining the another wheel while sandwiching, the first rack member being attached to the base member;
a spring hinge provided at a lower part than the first rack member on the base member; and
a second rack member for retaining the another wheel while sandwiching, the second rack member being connected to the base member through the spring hinge so as to become swingable;
wherein the second rack member is constructed so as to be automatically folded toward the first rack member through the spring hinge under a state that the second rack member does not retain the another wheel.

2. A bicycle retainer comprising a suspension member for suspending one of wheels of a bicycle, the suspension member being provided at an upper part in a passenger room, a retainer member for retaining another wheel of the bicycle, the retainer member being provided at a lower part in the passenger room, the bicycle retainer retaining the bicycle under a state that the bicycle is suspended in the passenger room, wherein the retainer member includes:
a base member fixed to a lower part of a seat of a flip-up seat;
a first rack member for retaining the another wheel while sandwiching, the first rack member being attached to the base member, the first rack member being movable in up and down direction;
a spring hinge provided at a lower end portion of the first rack member; and
a second rack member for retaining the another wheel while sandwiching, the second rack member being connected to the first rack member through the spring hinge so as to become swingable;
wherein the second rack member is constructed so as to be automatically folded toward the first rack member through the spring hinge under a state that the second rack member does not retain the another wheel.

3. The bicycle retainer according to claim 2, wherein the base member comprises a stopper member to prevent the first rack member and the second rack member from being dropped downward by contacting with the second rack member when the first rack member and the second rack member retain the another wheel under a state that both the first rack member and the second rack member are raised up.

4. The bicycle retainer according to claim 1, further comprising a cushion member to relieve shock occurring when the second rack member is folded when the second rack member is automatically folded toward the first rack member through the spring hinge.

5. The bicycle retainer according to claim 1, further comprising:
a string member with elasticity attached to the base member;
a hook member attached to the string member; and
a hooked member to which the hook member is hooked.

6. The bicycle retainer according to claim 2, further comprising a cushion member to relieve shock occurring when the second rack member is folded when the second rack member is automatically folded toward the first rack member through the spring hinge.

7. The bicycle retainer according to claim 2, further comprising:
a string member with elasticity attached to the base member;
a hook member attached to the string member; and
a hooked member to which the hook member is hooked.

* * * * *